(12) United States Patent
Tang et al.

(10) Patent No.: US 11,345,011 B2
(45) Date of Patent: May 31, 2022

(54) TRIGGER SWITCH DEVICE OF POWER TOOL FOR PREVENTING ACCIDENTAL TRIGGERING

(71) Applicant: JENN FENG NEW ENERGY CO., LTD., Taoyuan (TW)

(72) Inventors: Yung-Chun Tang, Taoyuan (TW); Chih-Hsing Lee, Taoyuan (TW); Kuei-Wei Hsu, Taoyuan (TW)

(73) Assignee: JENN FENG NEW ENERGY CO., LTD., Taoyuan (TW)

( * ) Notice: Subject to any disclaimer, the term of this patent is extended or adjusted under 35 U.S.C. 154(b) by 205 days.

(21) Appl. No.: 16/895,437

(22) Filed: Jun. 8, 2020

(65) Prior Publication Data

US 2021/0379751 A1    Dec. 9, 2021

(51) Int. Cl.
*B25F 5/02* (2006.01)
*F16P 3/00* (2006.01)

(52) U.S. Cl.
CPC . *B25F 5/02* (2013.01); *F16P 3/00* (2013.01)

(58) Field of Classification Search
CPC .............. B25F 5/02; F16P 3/00; B25C 1/008
USPC ........................................................ 173/170
See application file for complete search history.

(56) References Cited

U.S. PATENT DOCUMENTS

| | | | | |
|---|---|---|---|---|
| 2,346,778 A * | 4/1944 | Walter | ................... | B23B 45/001 173/217 |
| 3,971,906 A * | 7/1976 | Sahrbacker | ............... | B25F 5/02 200/43.17 |
| 4,095,072 A * | 6/1978 | Piber | ...................... | H01H 9/061 388/831 |
| 4,206,333 A * | 6/1980 | Savas | ..................... | H01H 13/08 200/290 |
| 7,297,891 B2 * | 11/2007 | Omori | .................... | H01H 9/063 200/522 |
| 8,550,320 B2 * | 10/2013 | Nakano | ..................... | B25C 1/06 227/8 |
| 8,800,835 B2 * | 8/2014 | Perron | .................... | B25C 1/043 227/8 |
| 11,235,454 B2 * | 2/2022 | Sabin | .................... | B24B 45/006 |
| 2004/0035009 A1 * | 2/2004 | Richards | ................ | A01G 3/053 30/210 |
| 2004/0049926 A1 * | 3/2004 | Miklosz | .................... | B25F 5/02 30/388 |

(Continued)

*Primary Examiner* — Nathaniel C Chukwurah
*Assistant Examiner* — Lucas E. A. Palmer
(74) *Attorney, Agent, or Firm* — Muncy, Geissler, Olds & Lowe, P.C.

(57) ABSTRACT

A trigger switch device of power tool for preventing accidental triggering is disclosed, comprising a trigger, provided at front end of the handle of power tool, and a safety switch, provided at a side of the handle; when neither the trigger nor the safety switch is operated, the safety switch locks the trigger so that the trigger cannot pressed; when the safety switch is pressed, the lock on the trigger is released and the trigger can be pressed. When the safety switch is released with the trigger pressed, the safety switch locks the trigger so that the trigger remains in the pressed state; when the trigger is in the pressed state and the safety switch is operated, the trigger is unlocked and automatically returns to the original non-pressed position and the safety switch locks the trigger again. As such, the trigger cannot be pressed to prevent accidental triggering.

5 Claims, 8 Drawing Sheets

(56) References Cited

U.S. PATENT DOCUMENTS

| | | | |
|---|---|---|---|
| 2012/0061216 A1* | 3/2012 | Kawakami | H01H 13/06 200/302.2 |
| 2014/0014385 A1* | 1/2014 | Kosugi | B25F 5/02 173/217 |
| 2014/0015383 A1* | 1/2014 | Kokinelis | H02P 31/00 310/68 A |
| 2015/0113815 A1* | 4/2015 | McRoberts | B23D 51/01 30/392 |
| 2015/0115857 A1* | 4/2015 | Sergyeyenko | H02P 25/24 318/504 |
| 2015/0170848 A1* | 6/2015 | Kannan | H01H 3/20 200/43.17 |
| 2017/0072523 A1* | 3/2017 | Gerstenberger | B25F 5/00 |
| 2017/0372855 A1* | 12/2017 | Sato | H01H 3/20 |
| 2020/0219675 A1* | 7/2020 | Wong | H01H 3/20 |
| 2020/0306847 A1* | 10/2020 | Osawa | B27B 17/0008 |
| 2020/0403544 A1* | 12/2020 | Ishikawa | H02P 23/0077 |
| 2021/0078146 A1* | 3/2021 | Araki | B25F 5/001 |

* cited by examiner

TRIGGER SWITCH DEVICE OF POWER TOOL FOR PREVENTING ACCIDENTAL TRIGGERING

BACKGROUND OF THE INVENTION

1. Field of the Invention

The present invention relates generally to a trigger switch device of power tool, and more particularly, to a trigger switch device of power tool for preventing accidental triggering.

2. The Prior Arts

Generally, hand-held power tools such as electric drills, electric grinders, and the like, are provided with a trigger in front of the handle to actuate or stop the motor, and then drive the cutter, grinder or drill portion connected to the power tool to actuate through a transmission mechanism. Since power tools are dangerous when the trigger is accidentally touched by the user or others in the power-on standby state, some power tools have been provided with safety switches to avoid the danger.

A conventional safety switch provided in a power tool is often disposed on a handle and protrudes from both sides of the handle at opposite ends. The portion of the safety switch inside the handle is connected to a power switch inside the handle through a mechanism. When the safety switch moves in a first direction, the power switch is turned off, and even if the trigger is pressed or touched, the motor cannot be started. When the safety switch moves in an opposite second direction, the power switch is turned on, and the motor can be actuated when the trigger is pressed or touched.

The disadvantage of the conventional safety switch of the power tool is that when the user wants to use the power tool and the safety switch turns on the power switch, the trigger must be continuously pressed to keep the motor running, which is tiresome if using the power tool for an extended duration. In addition, when the user releases the trigger for a temporary break, it is easy to forget the switch the safety switch to the power-off state and there is still the risk of the trigger being accidentally triggered.

SUMMARY OF THE INVENTION

A primary objective of the present invention is to provide a safer anti-mis-triggered power tool trigger switch device to solve the aforementioned inconvenience of the conventional power tool and the risk that the trigger will be triggered accidentally.

For achieving the foregoing objectives, the characteristics of the present invention comprise: a trigger provided at front end of the handle of a power tool, and a safety switch provided at a side of the handle; when neither the trigger nor the safety switch is operated, the safety switch locks the trigger so that the trigger cannot pressed; when the safety switch is pressed, the lock on the trigger is released and the trigger can be pressed. When the safety switch is released with the trigger pressed, the safety switch locks the trigger so that the trigger remains in the pressed state; when the trigger is in the pressed state and the safety switch is operated to unlock the trigger, the trigger automatically returns to the original non-pressed position and the safety switch locks the trigger again. As such, the trigger cannot be pressed to prevent accidental triggering.

The technical means of a trigger switch device of power tool for preventing accidental triggering provided by the present invention comprise: a trigger, slidably disposed at a first position of a handle of the power tool, and a first spring provided between the trigger and the handle, and the trigger being provided with a first brake unit; and a safety switch, slidably disposed in a second position of the handle, a second spring provided between the safety switch and the handle, and the safety switch being provided with a second brake unit; wherein, when neither the trigger nor the safety switch receiving any force, the second brake unit locking the first brake unit, so that the trigger unable to be pressed; wherein, when the safety switch being pressed by a force, after compressing the second spring, the second brake unit unlocking the first brake unit; at this point, in the state of the trigger being pressed to compress the first spring, when the force of pressing the safety switch being released, the second spring releasing an elastic force on the safety switch to cause the second brake unit to lock the first brake unit, so that the trigger remaining in a pressed state; and when the safety switch being pressed while the trigger remaining in the pressed state, the second brake unit unlocking the first brake unit, and the first spring releasing an elastic force on the trigger to cause the trigger to return to original position; the same time, the second brake unit locking the first brake unit again, so that the trigger unable to be pressed.

Preferably, the first position refers to a front position of the handle, and the trigger moves in the front-and-rear direction of the handle, the second position refers to a side position of the handle, and the safety switch moves in a right-and-left direction perpendicular to the handle, which are more convenient to operate because the first position and the second position are adjacent to each other.

Preferably, the first brake unit is provided with a plate behind the trigger, and a groove is provided behind the plate; and the second brake unit is provided with a shaft body on the safety switch, the shaft body is provided with a ring groove and a flange, the flange is located between the ring groove and a free end of the shaft body, the flange has an outer diameter greater than width of the groove, and the ring groove has a bottom diameter smaller than the width of the groove, and the second spring is assembled with the shaft body, thereby simplifying the structure of the first brake unit and the second brake unit, so as to reduce the manufacturing cost.

Preferably, the trigger is provided with a protrusion, and a positioning portion is provided on inner wall surface of the handle, the two ends of the first spring are respectively connected to the protrusion and the positioning portion, so that both ends of the first spring connect the trigger and the handle steadily.

Preferably, the present invention is further provided with a slider on the trigger, two opposite sides of the slider glidingly fit into slide grooves provided on the opposite side walls inside the handle, and the slider is used to act on an actuating switch provided in the handle to start a motor of the power tool when the trigger is pressed.

Compared with the safety device of the conventional power tool, when using the power tool with the trigger switch device of the present invention, the safety switch device is locked while the trigger is pressed and the motor can continue to run, even if the tool continues to work, the user does not need to continuously press a finger on the trigger, so the operation is more convenient, labor-saving and easy to reduce the fatigue. In addition, when a break is required, the safety switch must be operated to unlock the trigger. At this point, the trigger will automatically power off the power switch to stop the motor. In this state, the trigger is locked and cannot be pressed, so as to avoid accidental triggering, which greatly improves the safety of use.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

The aforementioned "front", "front end" or "front side" refers to the orientation of the cutter of the power tool; "rear", "rear end", "rear side" refers to the direction relative to the front, front end or front side; "Side" or "Side" is the direction perpendicular to the front-rear direction.

Figure 1:
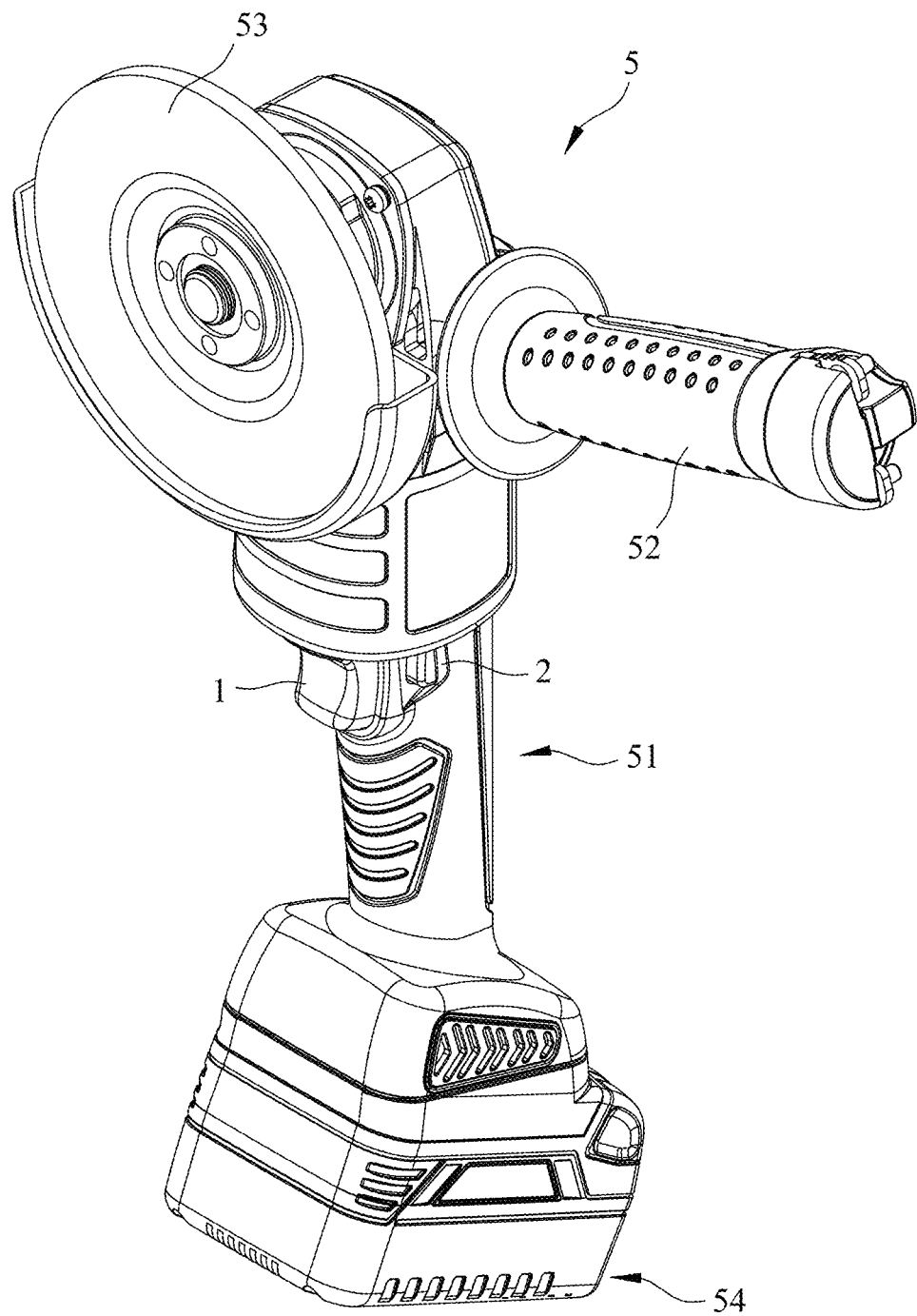
FIG. 1 is a schematic perspective view showing an embodiment in which the trigger and the safety switch of the present invention provided in a power tool.
Figure 2:
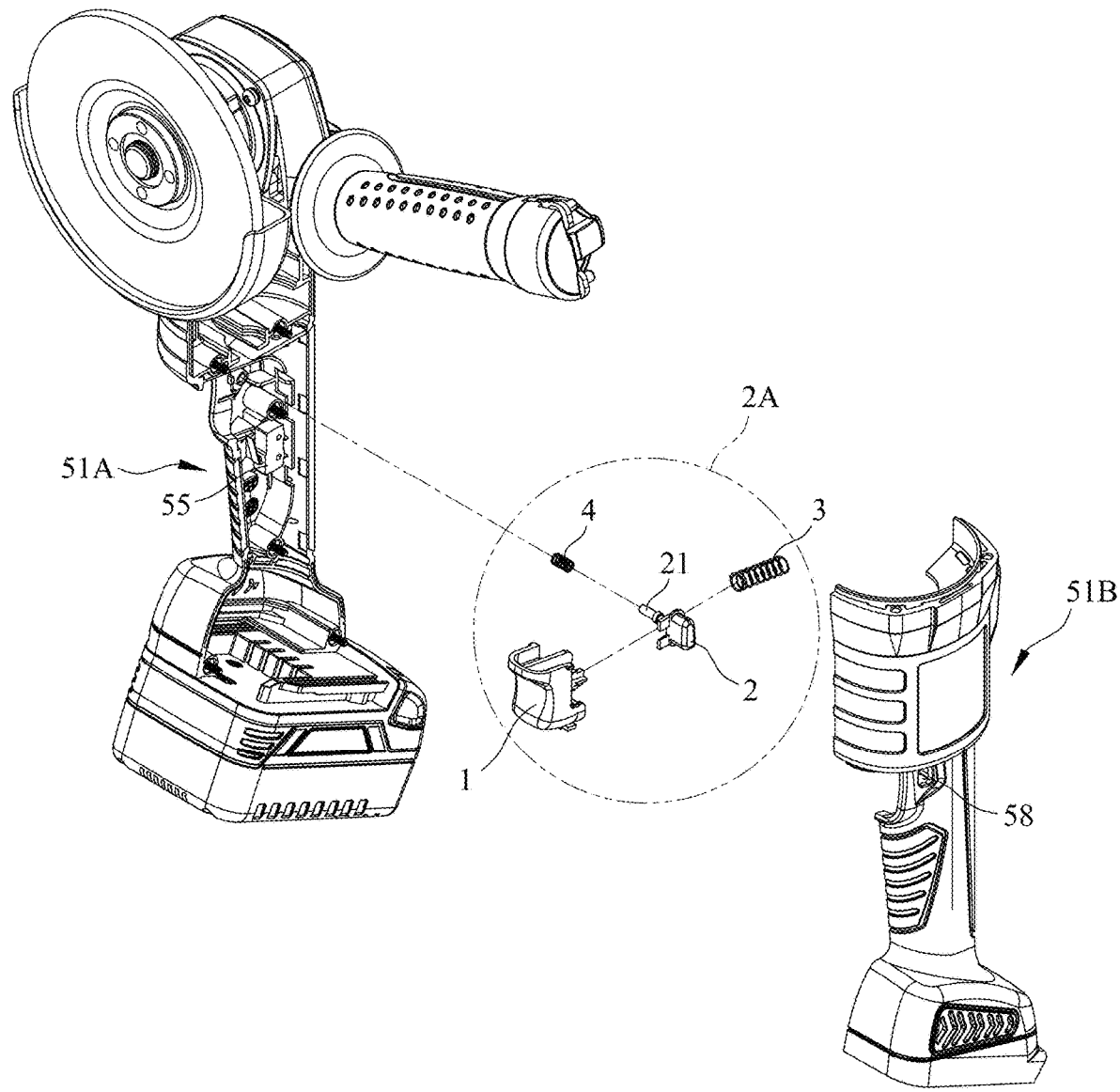
FIG. 2 is an exploded perspective view of an embodiment showing the related structure and component assembly relationship of the present invention.
Figure 2A:
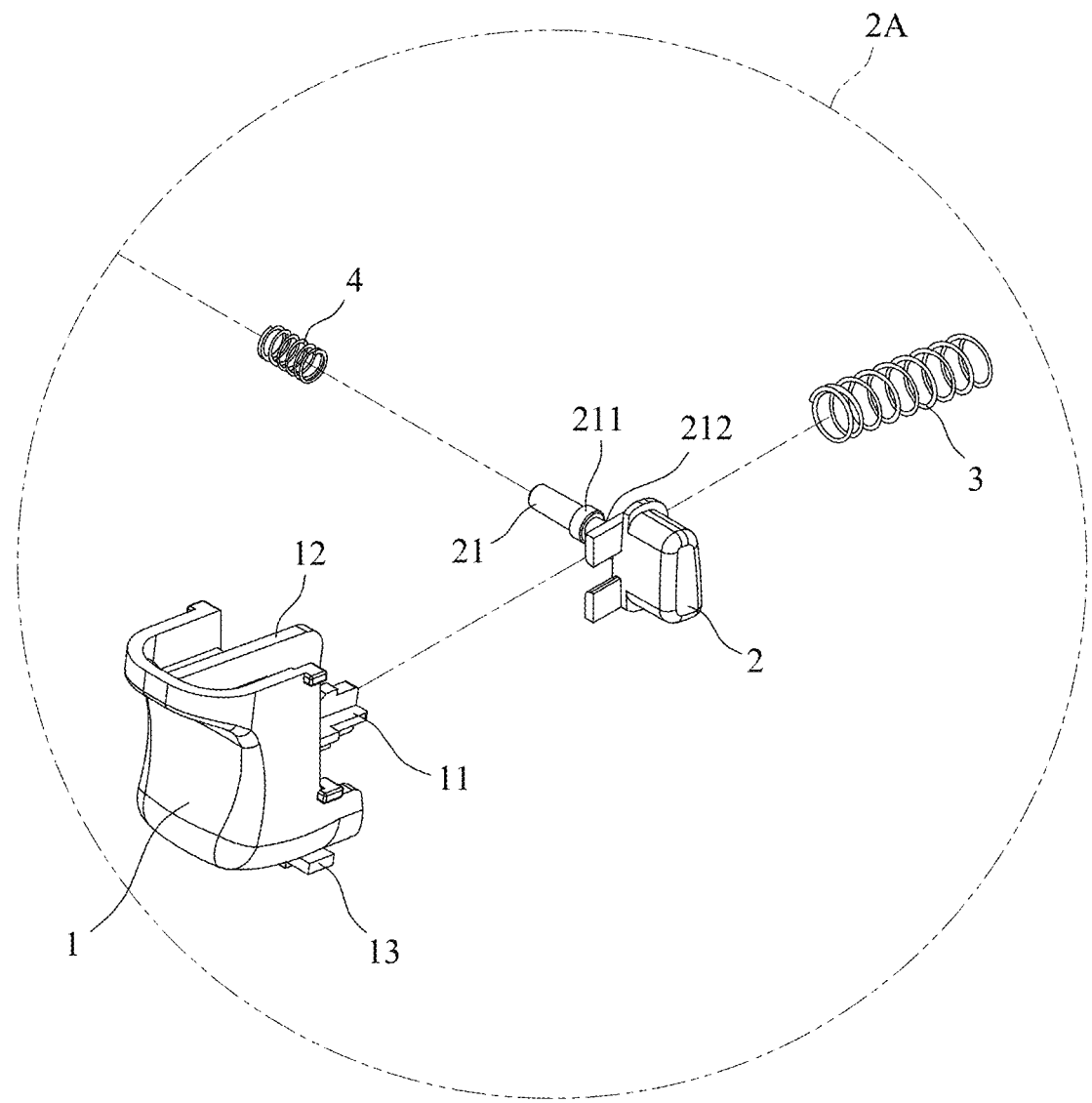
FIG. 2A is a partially enlarged view of part 2A in FIG. 2.
Figure 3:
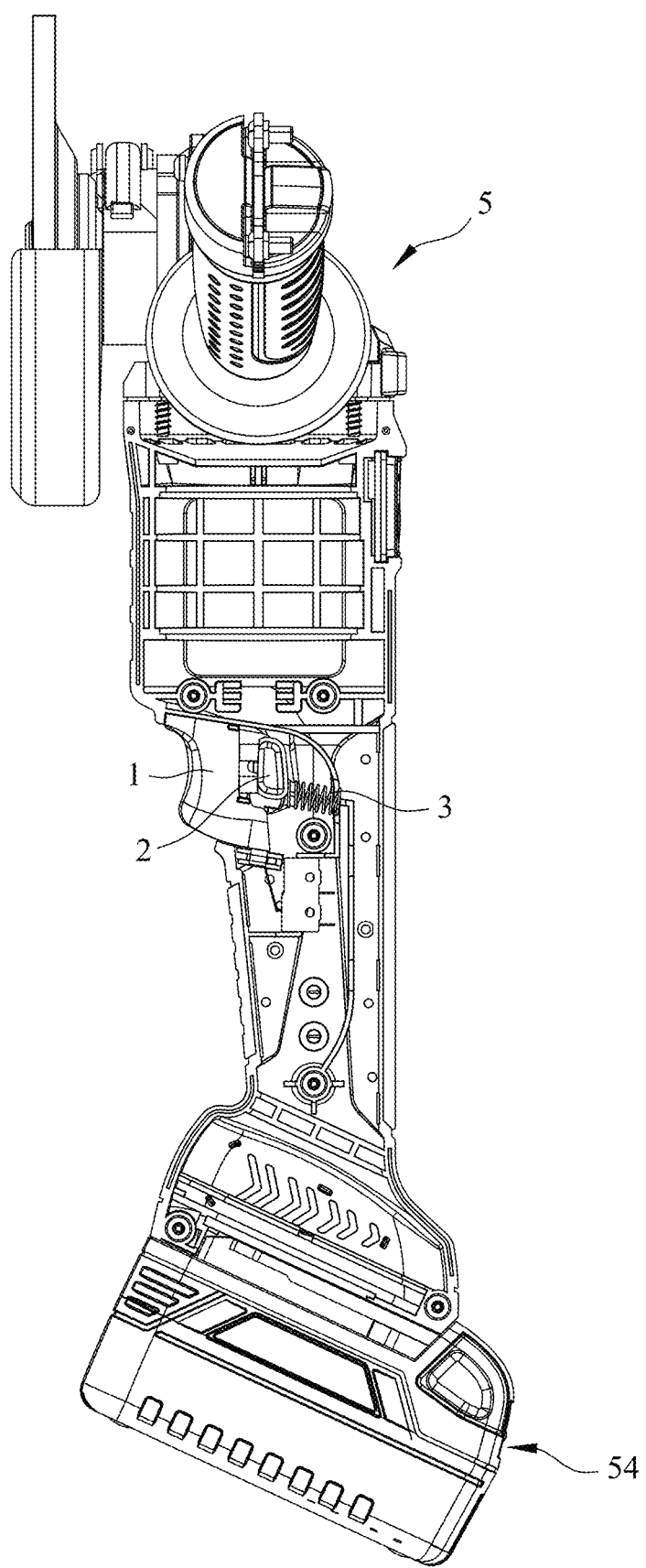
FIG. 3 is a planar cross-sectional view showing an embodiment of the relevant structure of the present invention.

FIG. 1 shows an embodiment of a trigger switch device of power tool for preventing accidental triggering of the present invention applied to a hand-held electric grinder to control the operation or stop of the motor; however, the present invention is not limited to this, and can also be applied to power tools such as electric drills, electric saws, etc. The hand-held power tool 5 has a handle 51 for single-handed holding; a rechargeable battery 54 is installed at the lower end of the handle 51; a lateral auxiliary handle 52 and a tool are provided at the upper end of the handle 51, the auxiliary handle 52 allow the user to use the other hand to assist the grip to improve the stability of the operation. The tool in the embodiment of FIG. 1 is the grinding disc 53, which may be a drill, a saw or a cutter. The front end of the handle 51 is provided with a trigger 1 and a safety switch 2 on the side. When neither the trigger 1 nor the safety switch 2 is operated, the safety switch 2 locks the trigger 1 so that the trigger 1 cannot be pressed; when the safety switch 2 is pressed, the trigger 1 is unlocked. At this point, the trigger 1 can be pressed. When the safety switch 2 is released when the trigger 1 is pressed, the safety switch 2 locks the trigger 1 so that the trigger 1 remains in the pressed state; while the trigger 1 remaining in the pressed state, the safety switch 2 can be operated again to unlock the trigger 1, so that the trigger 1 automatically returns to the original position, and the safety switch 2 locks the trigger 1 again, so that the trigger 1 cannot be pressed, thereby prevent the trigger 1 from being accidentally operated.

As shown in FIG. 2 to FIG. 7, the preferred embodiment of the trigger switch device of the power tool for preventing accidental triggering of the present invention comprises a trigger 1 and a safety switch 2; wherein, the trigger 1 is slidably disposed at a first position of a handle 51 of the power tool 5, and a first spring 3 is provided between the trigger 1 and the handle 51, and the trigger 1 is provided with a first brake unit; the safety switch 2 is slidably disposed in a second position of the handle 51, a second spring 4 is provided between the safety switch 2 and the handle 51, and the safety switch 2 is provided with a second brake unit. The handle 51 comprises a first housing shell 51A and a second housing shell 51B, disposed opposite to each other.

More specifically, the first position refers to a front position of the handle 51, specifically, to the front position between the first housing shell 51A and the second housing shell 51B, and the trigger 1 moves in the front-and-rear direction of the handle 51. The second position refers to a side position of the handle 51, specifically, to the side position of the second housing shell 51B, and the safety switch 2 moves in a right-and-left direction perpendicular to the handle 51, specifically, the safety switch 2 is disposed in a through hole 58 provided in the second housing shell 51B to move in the left-and-right direction.

The first brake unit is provided with a plate 12 behind the trigger 1, and a horizontal groove 121 is provided behind the plate 12. The second brake unit is provided with a shaft body 21 monolithically formed on the safety switch 2, the shaft body 21 is provided with a ring groove 212 and a flange 211, the flange 211 is located between the ring groove 212 and a free end of the shaft body 21, the flange 211 has an outer diameter greater than width of the groove 121, and the ring groove 212 has a bottom diameter smaller than the width of the groove 121. The second spring 4 is assembled with the shaft body 21 from the free end of the shaft body 21 and is stopped by the flange 211. The safety switch 2 is assembled with the second spring 4 in the handle 51, that is, a pressing portion at one end of the safety switch 2 passes through the through hole 58 from the inner side of the second housing shell 51B, and a stopper portion provided on the safety switch 2 is blocked by the peripheral edge of the through hole 58 and cannot be detached outward from the second housing shell 51B. As such, the safety switch 2 can only move linearly in the through hole 58.

The trigger 1 is provided with a protrusion 11 formed monolithically, and a positioning portion 57 is provided on inner wall surface of the handle 51. When the trigger 11 is assembled with the handle 51, the protrusion 11 and the positioning portion 57 almost correspond linearly. Also, the two ends of the first spring 3 are respectively connected to the protrusion 11 and the positioning portion 57. The elastic force of the first spring 3 acts forwards on the trigger 1, the trigger 1 is kept in the original position without external force. In this original position, the motor of the power tool (not shown in the figure) is not subject to any operation, that is, the motor is not running. Moreover, the present invention is further provided with a slider 13 on the trigger 1, two opposite sides of the slider 13 glidingly fit into slide grooves 56 provided on the opposite side walls inside the handle 51.

When the trigger 1 is pressed backwards, the slider 13 is used to act on an actuating switch 55 provided in the handle 51. The actuating switch 55 then conducts the current through wire to the motor to start the motor.

The operation of the present invention is as follows:

When neither the trigger 1 nor the safety switch 2 receives any force, the safety switch 2 uses the second brake unit to lock the first brake unit, so that the trigger is unable to be pressed to prevent accidental trigger. Specifically, as shown in FIG. 4 and FIG. 6, when neither the trigger 1 nor the safety switch 2 receives any force, the radial direction of the flange 211 on the shaft body 21 corresponds to the groove 121 at the rear end of the plate 12, but because the outer diameter of the flange 211 is larger than the width of the groove 121, the flange 211 cannot enter the groove 121, so that the trigger 1 cannot be pressed, that is, the trigger 1 is locked by the safety switch 2.

Figure 5:
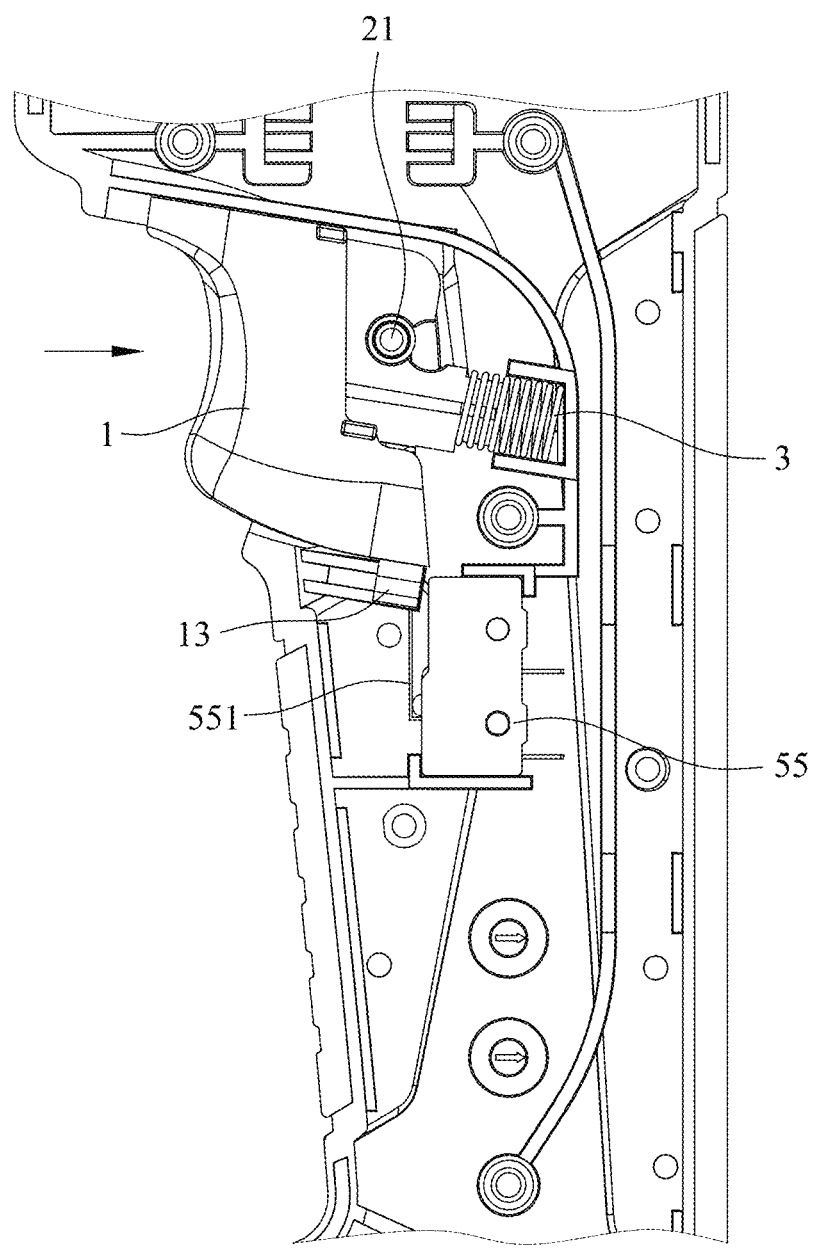
FIG. 5 is an enlarged partial front view of the present invention showing the trigger in a state of being pressed after being released by the safety switch.
Figure 7:
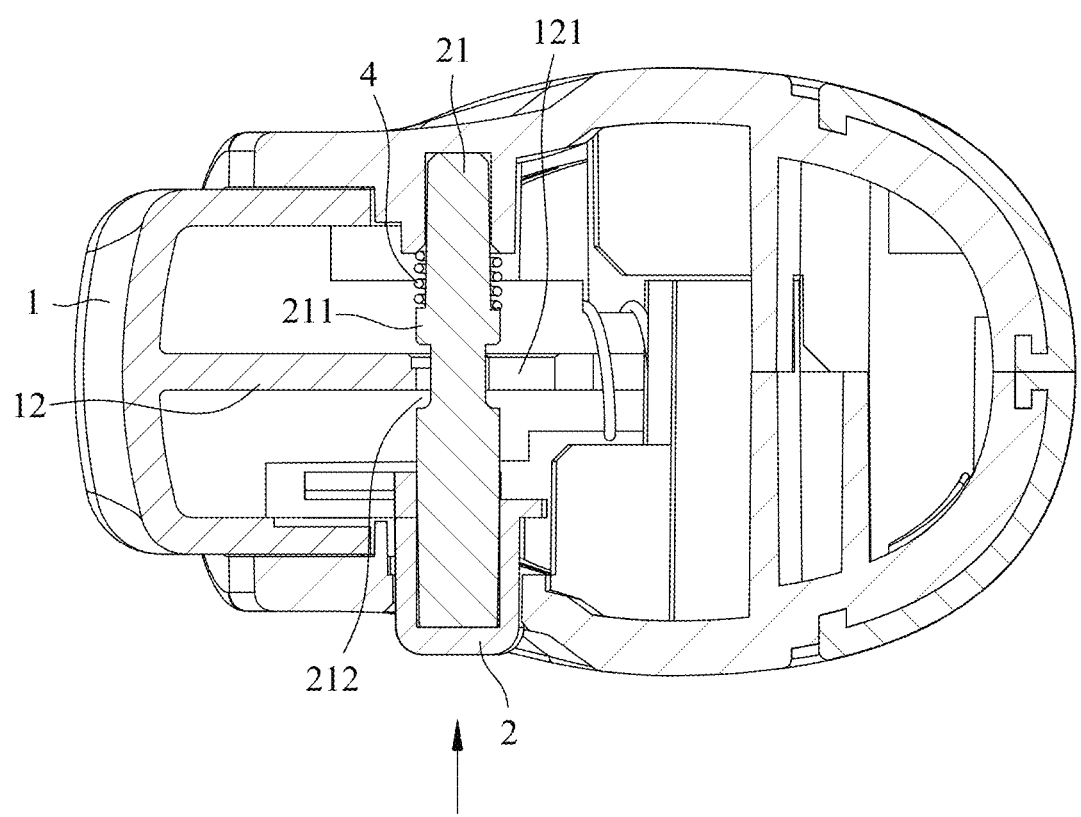
FIG. 7 is an enlarged partial top view of the present invention showing a state where the safety switch is pressed to release the lock on the trigger.

When the safety switch 2 is pressed by a force to the second spring 4, the safety switch 2 uses the second brake unit to release the locking the first brake unit. At this point, the trigger 1 can be pressed. While the trigger 1 is in the state of being pressed to compress the first spring 3, when the force of pressing the safety switch 2 is released, the second spring 4 releases an elastic force on the safety switch 2 to cause the second brake unit to lock the first brake unit, so that the trigger 1 remains in a pressed state. Specifically, as shown in FIG. 5 and FIG. 7, when the safety switch 2 is pressed, the ring groove 212 on the shaft body 21 is displaced to correspond to the groove 121 at the rear end of the plate 12. The bottom diameter of the ring groove 212 is smaller than the width of the groove 121 so that the ring groove 212 can enter the groove 121, which causes the trigger 1 to become able to be pressed; while the trigger 1 is pressed, the slider 13 sliding along the slide groove 56 will touch an actuating portion 551 of the actuating switch 55 provided in the handle 51 to turn on the current, so that the current is transmitted to the motor for driving operation.

Figure 4:
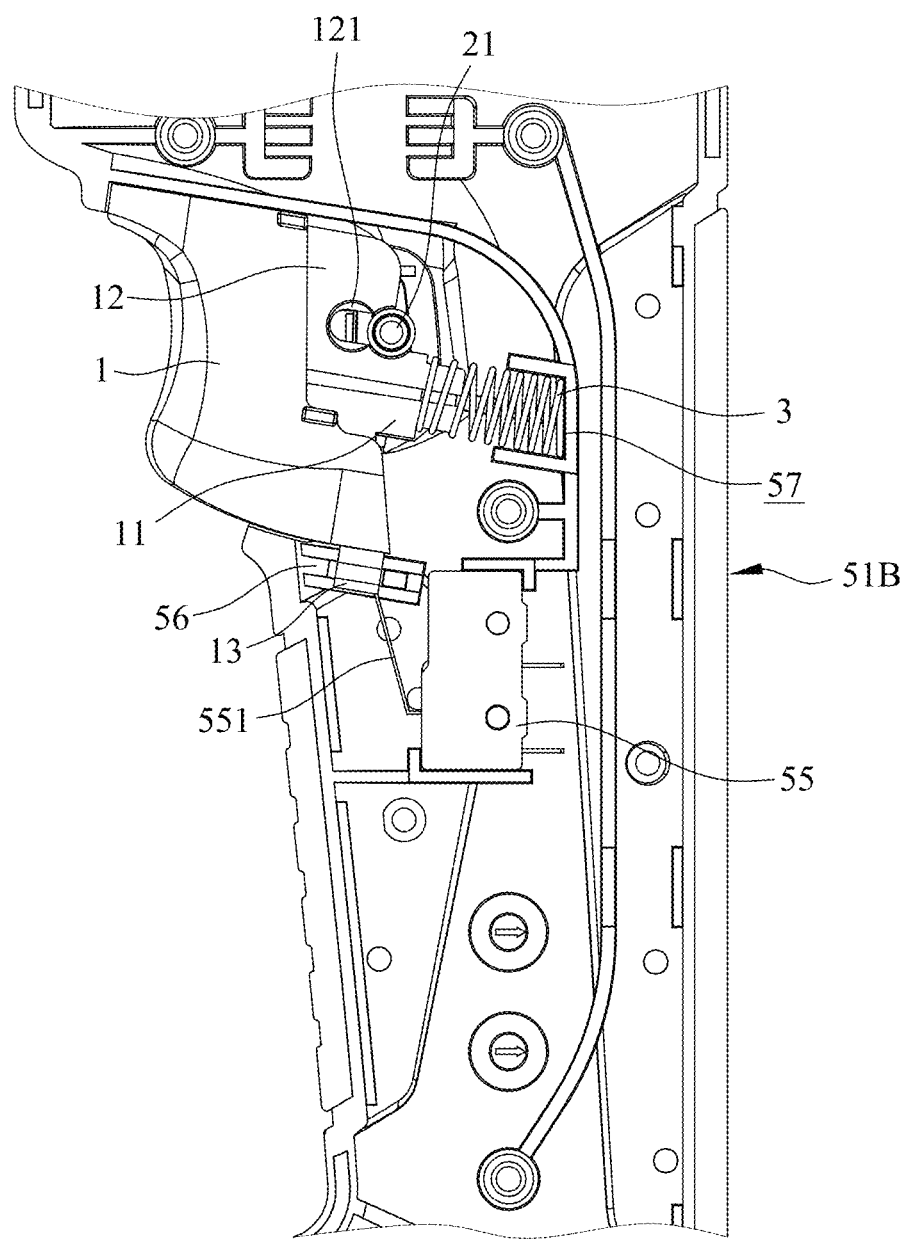
FIG. 4 is an enlarged partial front view of the present invention showing the trigger in a state of being locked by the safety switch and unable to be pressed.
Figure 6:
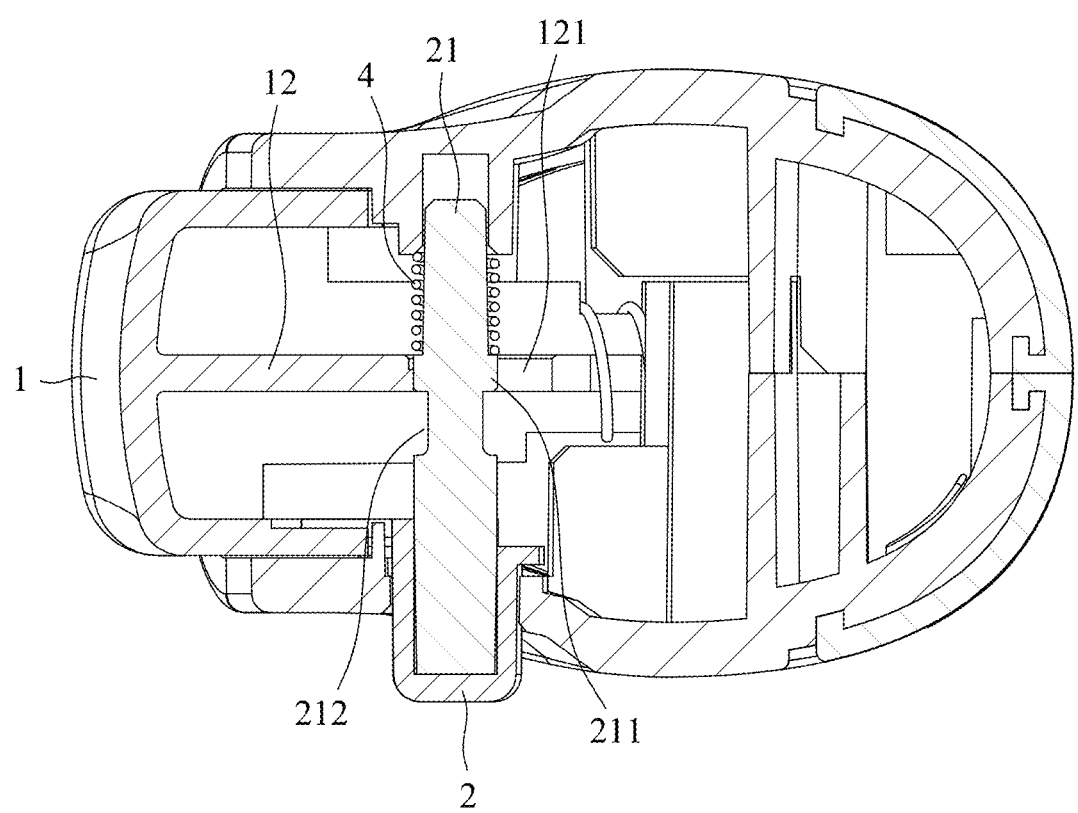
FIG. 6 is an enlarged partial top view of the present invention showing a state where the safety switch locks the trigger.

When the safety switch 2 is pressed while the trigger 1 remaining in the pressed state, the safety switch 2 uses the second brake unit to release the locking on the first brake unit, and the first spring releases an elastic force on the trigger 1 to cause the trigger 1 to return to the original position; the same time, the second brake unit locks the first brake unit again, so that the trigger 1 becomes unable to be pressed, in other words, returning to the state of being locked in FIG. 4 and FIG. 6.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A trigger switch device of power tool for preventing accidental triggering, comprising:
a trigger, slidably disposed at a first position of a handle of the power tool, and a first spring provided between the trigger and the handle, and the trigger being provided with a first brake unit; and
a safety switch, slidably disposed in a second position of the handle, a second spring provided between the safety switch and the handle, and the safety switch being provided with a second brake unit;
wherein, when neither the trigger nor the safety switch receiving any force, the second brake unit locking the first brake unit, so that the trigger unable to be pressed;
wherein, when the safety switch being pressed by a force, after compressing the second spring, the second brake unit unlocking the first brake unit; at this point, in the state of the trigger being pressed to compress the first spring, when the force of pressing the safety switch being released, the second spring releasing an elastic force on the safety switch to cause the second brake unit to lock the first brake unit, so that the trigger remaining in a pressed state; and
wherein, when the safety switch being pressed while the trigger remaining in the pressed state, the second brake unit unlocking the first brake unit, and the first spring releasing an elastic force on the trigger to cause the trigger to return to original position; the same time, the second brake unit locking the first brake unit again, so that the trigger unable to be pressed.

2. The trigger switch device of power tool for preventing accidental triggering according to claim 1, wherein the first position refers to a front position of the handle, and the trigger moves in the front-and-rear direction of the handle, the second position refers to a side position of the handle, and the safety switch moves in a right-and-left direction perpendicular to the handle.

3. The trigger switch device of power tool for preventing accidental triggering according to claim 1, wherein:
the first brake unit is provided with a plate behind the trigger, and a groove is provided behind the plate; and
the second brake unit is provided with a shaft body on the safety switch, the shaft body is provided with a ring groove and a flange, the flange is located between the ring groove and a free end of the shaft body, the flange has an outer diameter greater than width of the groove, and the ring groove has a bottom diameter smaller than the width of the groove, and the second spring is assembled with the shaft body.

4. The trigger switch device of power tool for preventing accidental triggering according to claim 1, wherein the trigger is provided with a protrusion, and a positioning portion is provided on inner wall surface of the handle, the two ends of the first spring are respectively connected to the protrusion and the positioning portion.

5. The trigger switch device of power tool for preventing accidental triggering according to claim 1, wherein the trigger is further provided with a slider on the trigger, two opposite sides of the slider glidingly fit into slide grooves provided on the opposite side walls inside the handle, and the slider is used to act on an actuating switch provided in the handle when the trigger is pressed.

* * * * *